United States Patent
Yokota

(10) Patent No.: US 9,132,720 B2
(45) Date of Patent: Sep. 15, 2015

(54) SASH MOUNTING STRUCTURE FOR VEHICLE DOOR AND SASH MOUNTING METHOD FOR VEHICLE DOOR

(71) Applicant: SHIROKI CORPORATION, Kanagawa (JP)

(72) Inventor: Kazuyoshi Yokota, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/380,421

(22) PCT Filed: Feb. 19, 2013

(86) PCT No.: PCT/JP2013/054003
§ 371 (c)(1),
(2) Date: Aug. 22, 2014

(87) PCT Pub. No.: WO2013/125524
PCT Pub. Date: Aug. 29, 2013

(65) Prior Publication Data
US 2015/0048646 A1  Feb. 19, 2015

(30) Foreign Application Priority Data
Feb. 24, 2012 (JP) .................. 2012-038236

(51) Int. Cl.
*B60J 5/04*  (2006.01)
*B60J 1/00*  (2006.01)
*B60J 1/17*  (2006.01)

(52) U.S. Cl.
CPC ............... *B60J 5/0408* (2013.01); *B60J 1/007* (2013.01); *B60J 1/17* (2013.01); *B60J 5/0402* (2013.01); *B60J 5/0468* (2013.01)

(58) Field of Classification Search
CPC .......... B60J 5/0408; B60J 5/0468; B60J 1/17; B60J 1/007

USPC ................ 49/502, 506, 440, 441; 296/146.1, 296/146.2, 146.5

See application file for complete search history.

(56) References Cited

U.S. PATENT DOCUMENTS 2,060,915 A * 11/1936 Westrope ...................... 49/376
2,361,608 A * 10/1944 Doty ............................. 49/376
(Continued)

FOREIGN PATENT DOCUMENTS

JP  S5967324     5/1984
JP  07089349 A   4/1995
(Continued)

OTHER PUBLICATIONS

International Search Report for PCT/JP2013/054003 dated Apr. 9 2013.
(Continued)

*Primary Examiner* — Jerry Redman
(74) *Attorney, Agent, or Firm* — Millen, White, Zelano & Branigan, P.C.

(57) ABSTRACT

A sash mounting structure includes positioners which are respectively provided at the lower end of an insertion support portion and the upper end of a lower sash that are inserted into and supported by a door panel, and which define the position of the lower sash relative to the side sash by being mutually engaged; and a fixer which is provided between the lower sash and the door panel, has a predetermined degree of freedom in fixing position in a vertical direction and fixes the lower sash to the door panel, wherein the lower sash is fixed to the door panel with the lower sash being positioned by the positioners. This structure strikes a balance between easiness of positioning the lower sash and accommodation of variations in accuracy, thus making it possible to improve the mounting workability when mounting the lower sash to the door panel.

3 Claims, 8 Drawing Sheets

(56) References Cited

U.S. PATENT DOCUMENTS

| | | | |
|---|---|---|---|
| 5,524,388 A * | 6/1996 | Chowdhury et al. | 49/374 |
| 6,119,405 A * | 9/2000 | Disson et al. | 49/502 |
| 7,152,373 B2 * | 12/2006 | Hoffman et al. | 49/502 |
| 2003/0089044 A1 * | 5/2003 | Okahara | 49/414 |
| 2007/0261313 A1 * | 11/2007 | Ruppert et al. | 49/502 |
| 2009/0145043 A1 * | 6/2009 | Yamashita et al. | 49/502 |

FOREIGN PATENT DOCUMENTS

| | | |
|---|---|---|
| JP | 2004306890 A | 11/2004 |
| JP | 2008183973 A | 8/2008 |
| JP | 2008230523 A | 10/2008 |
| JP | 2011148429 A | 8/2011 |

OTHER PUBLICATIONS

English Abstract of JP-2011148429, Publication Date: Aug. 4, 2011.
English Abstract of JP-2004306890, Publication Date: Nov. 4, 2004.
English Abstract of JP-2008183973, Publication Date: Aug. 14, 2008.
English Abstract of JP-2008230523, Publication Date: Oct. 2, 2008.
English Abstract of JP-07089349, Publication Date: Apr. 4, 1995.
English Translation of Claim 1 of JPS59-67324, Publication Date: May 7, 1984.

* cited by examiner

SASH MOUNTING STRUCTURE FOR VEHICLE DOOR AND SASH MOUNTING METHOD FOR VEHICLE DOOR

TECHNICAL FIELD

The present invention relates to a sash mounting structure and a sash mounting method for a vehicle door, and in particular relates to a structure and a method for mounting a lower sash to a door panel.

BACKGROUND ART

Vehicle doors having a structure such that door frame (sash) is mounted onto a door panel are provided, in addition to side sashes that project from the door panel to form a window opening, with lower sashes that guide a window class in the door panel. Conventionally, the lower sashes have been positioned and fixed independently with respect to the door panel (an inner panel which constitutes a part of the door panel), separately from the side sashes. For instance, in the vehicle door sash disclosed in Patent Literature 1, an approximate position of each lower sash can be set by inserting a lug provided at the upper end of the lower sash into the associated side sash (upper sash). However, in order to tolerate variations in part accuracy and assembling accuracy, a clearance is provided between each lower sash and the associated side sash (upper sash) in the sash lengthwise direction, so that a delicate position adjustment needs to be made to each lower sash in the sash lengthwise direction when the lower sashes are fixed to the door panel.

CITATION LIST

Patent Literature

Patent Literature 1: Japanese Unexamined Patent Publication No. 2008-230523

SUMMARY OF INVENTION

Technical Problem

The mounting of parts on the inner side of the door panel is performed through an access opening formed in the inner panel. In the case of a lower sash, the positioning of the lower sash with respect to a fixing portion (e.g., an insertion opening for a fastening bolt) which is formed on inner panel is performed after the lower sash is inserted into the inside of the access opening. However, in the structure providing a clearance between each lower sash and the associated side sash in the lengthwise direction, such a positioning is complicated, and there has been a demand for improvement in workability. In addition, the necessity for securing a certain clearance between each lower sash and the associated side sash has been a factor impairing the mounting workability.

The present invention has been devised in view of the problems described above, and an object of the present invention is to provide a sash mounting structure and a sash mounting method for a vehicle door which are superior in the mounting workability when mounting the lower sashes to the door panel.

Solution to Problem

The present invention is characterized by a sash mounting structure for a vehicle door including a side sash which guides a window glass so that the window glass can move up and down, and which includes a projecting portion that projects upward from a door panel and an insertion support portion which is inserted into the door panel; and a lower sash which is continuous with a lower part of the side sash, is fixed to an inner side of the door panel and guides the window glass in the door panel. The sash mounting structure includes positioners which are provided at an upper end of the lower sash and a lower end of the insertion support portion of the side sash, respectively, the positioners defining a position of the lower sash relative to the side sash by being mutually engaged; and a fixer which is provided between the lower sash and the door panel, has a predetermined degree of freedom in fixing position in a vertical direction and fixes the lower sash to the door panel.

Additionally, in a mounting method of the present invention, a sash mounting method, is provided, for a vehicle door including a side sash which guides a window glass so that the window glass can move up and down, and which includes a projecting portion that projects upward from a door panel and an insertion support portion which is inserted into the door panel; and a lower sash which is continuous with a lower part of the side sash, is fixed to inside of the door panel and guides the window glass in the door panel. The sash mounting method includes a step of mounting the side sash to the door panel, a step of defining a position of the lower sash relative to the side sash using positioners which are contactable with each other and are provided between an upper end of the lower sash and a lower end of the insertion support portion of the side sash, and a step of fixing the lower sash to the door panel by a fixer which is provided between the lower sash and the door panel and has a predetermined degree of freedom in fixing position in a vertical direction.

It is desirable for the fixer to include a lower bracket which is fixed to a lower end of the lower sash; and a fastening member which is inserted into communication holes respectively formed in the lower bracket and the door panel. One of the communication hole of the lower bracket and the communication hole of the door panel is formed as a hole which is elongated in the vertical direction.

It is desirable for the positioner to include an upper bracket which is provided as a separate member from the lower sash and is mounted to the upper end of the lower sash, wherein upward movement of the lower sash relative to the side sash is limited by engagement of a bracket-side insertion limit portion, which is formed on the upper bracket, with a side-sash-side insertion limit portion which is formed on a lower end of the side sash.

It is desirable for the side-sash-side insertion limit portion to include a projecting stepped portion which is formed by being cut and raised with respect to a reference surface of the side sash which is formed to extend in the vertical direction. The upper bracket includes a positioning lug which projects upward from a fit-over portion which fits over the upper end of the lower sash, and which is inserted in between the projecting stepped portion and the reference surface. The bracket-side insertion limit portion includes a width-widened portion which is formed on a base portion of the positioning lug to be capable of contacting a lower end surface of the projecting stepped portion.

It is desirable for upper bracket to include a pair of retaining lugs which project upward from the fit-over portion, which fits over the upper end of the lower sash, in a mutually facing positional relationship to clamp the side sash in a state where the positioning lug is inserted in between the projecting stepped portion and the reference surface. The positioning lug is provided between the pair of retaining lugs.

Advantageous Effects of Invention

According to the present invention described above, the positioning of the lower sash can be easily performed by making the lower sash abut against the lower end of the side sash. In this positioned state, the mounting of the lower sash is completed by fixing the lower sash to the door panel by means of the fixer, which has a predetermined degree of freedom in fixing position in the vertical direction. Accordingly, there is no need to perform a complicated positioning of the lower sash like that of the related art, and the mounting workability for mounting the lower sash to the door panel is improved.

DESCRIPTION OF EMBODIMENT

Figure 1:
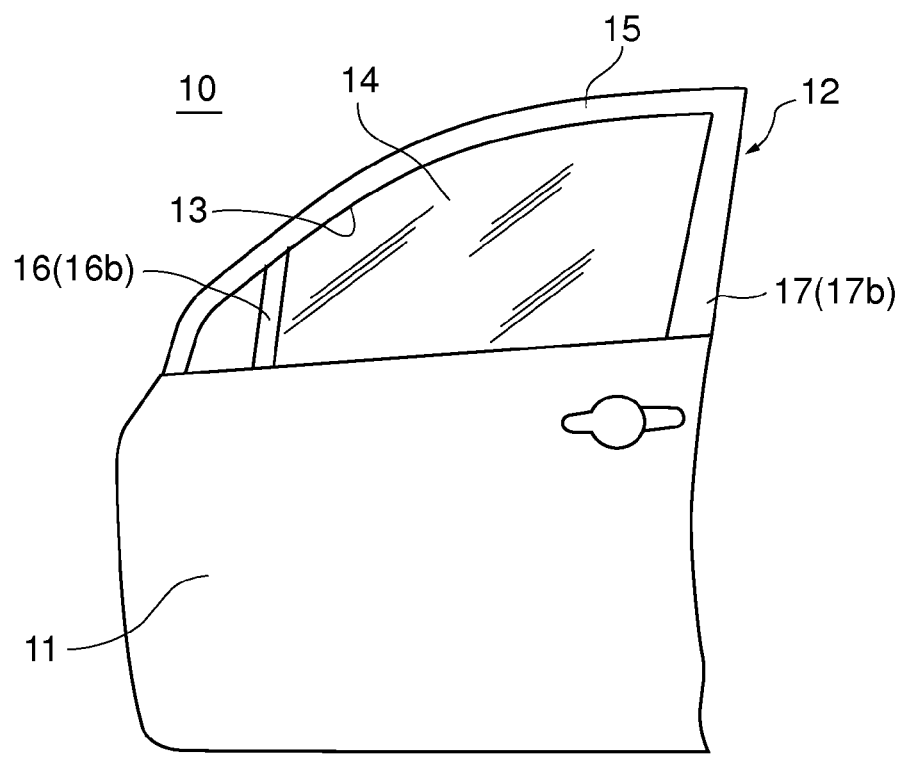
FIG. 1 is a diagram of a vehicle door to which the present invention has been applied, viewed from the vehicle exterior side.

FIG. 1 shows a schematic structure of a front door (hereinafter referred to as a door) 10, of a passenger vehicle, to which the present invention is applied. The door 10 is provided with a door panel 11 and a door frame 12, and the area of the door 10 which is surrounded by the upper edge of the door panel 11 and the inner periphery of the door frame 12 defines a window opening 13. A window glass 14 is provided in the window opening 13 to be upwardly and downwardly movable. The door frame 12 is provided with an upper sash 15 which forms the upper edge of the door 10, a front side sash 16 which extends downward from the front end of the upper sash 15, and a rear side sash 17 which extends downward from the rear end of the upper sash 15. The forward/rearward direction and the upward/downward direction in the following descriptions correspond to the forward/rearward direction and the upward/downward direction of the vehicle, to which the door 10 is mounted, respectively.

Figure 2:
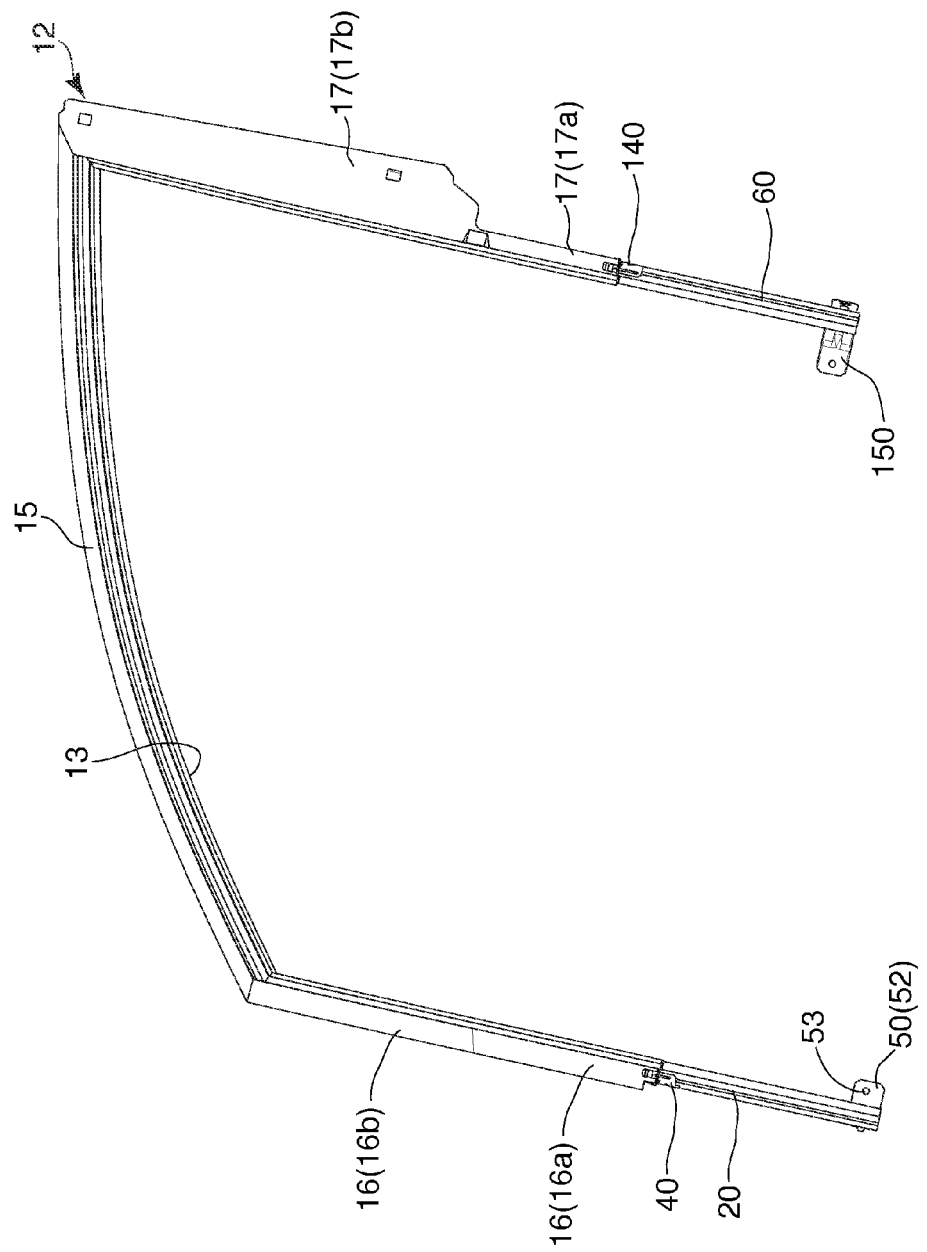
FIG. 2 is a side elevational view of a door frame and lower sashes that constitute components of the door shown in FIG. 1.
Figure 5:
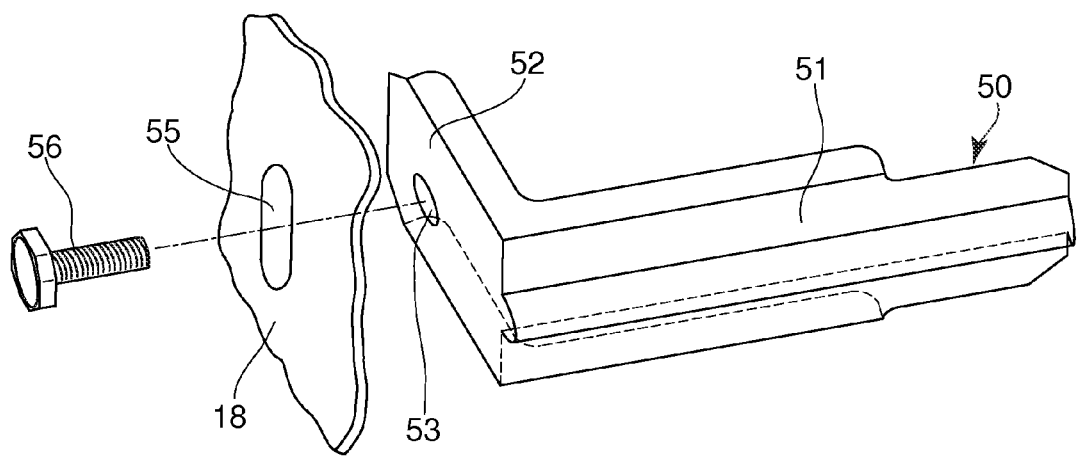
FIG. 5 is a perspective view of a lower bracket and a portion of an inner panel.

The door panel 11 is provided with an outer panel which is positioned on the vehicle exterior side and an inner panel 18 (a part of which is shown in FIG. 5) which is positioned on the vehicle interior side. As shown in FIG. 2, the lower sections of the front side sash 16 and the rear side sash 17 are formed as insertion support portions 16a and 17a which are inserted into the panel internal space between the outer panel and the inner panel 18 and fixed to the inner panel 18 via brackets, etc., not shown in the drawings. In the completed state of the door 10 shown in FIG. 1, of the lower side sash 16 and the rear side sash 17, the insertion support portions 16a and 17a are not externally exposed, and only frame exterior portions (projecting portions from the door panel) 16b and 17b project upward from the door panel 11 to form the window opening 13. In the door panel 11, a lower sash 20 and a lower sash 60 are provided, which are respectively continuous with the insertion support portion 16a of the front side sash 16 and the insertion support portion 17b of the rear side sash 17. Although a structure and a method for mounting the lower sash 20 will be discussed below as representative examples, the structure and the method for mounting the lower sash 60 also have similar features.

Figure 3:
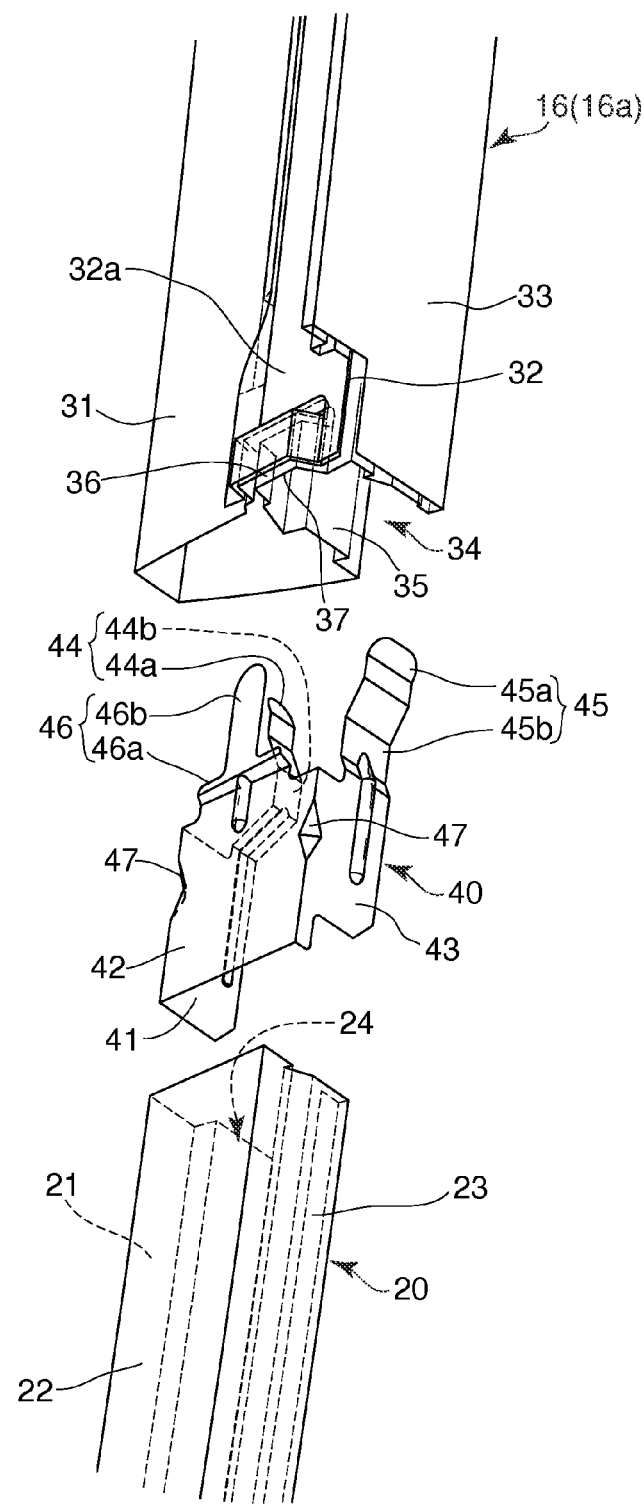
FIG. 3 is a perspective view of the joint between a front side sash, an upper bracket and a lower sash in a disassembled state.
Figure 4:
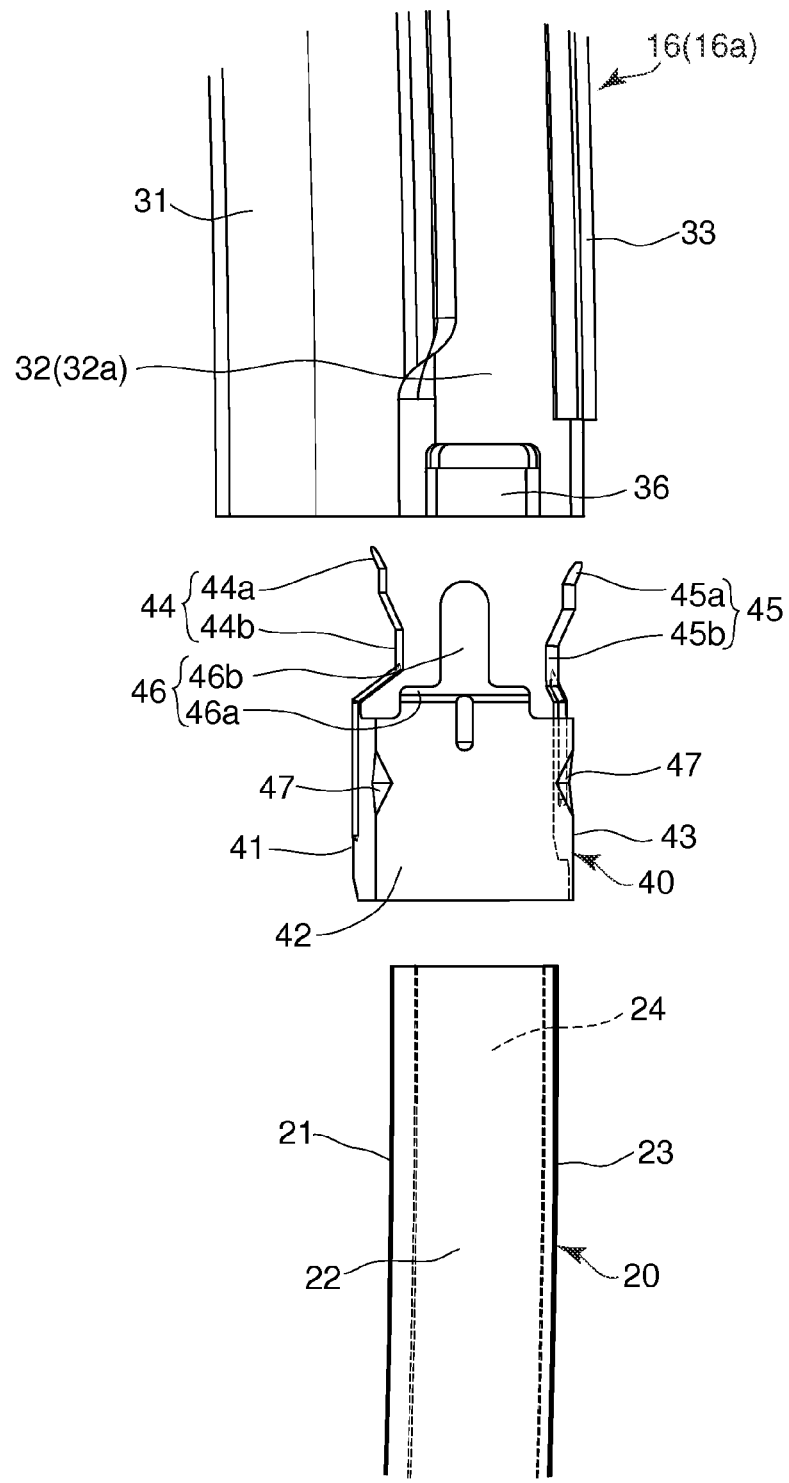
FIG. 4 is a front elevational view of the joint between the front side sash, the upper bracket and the lower sash in a disassembled state.

As shown in FIG. 3, the front side sash 16 is provided with a hollow-shaped portion 31 having a pocket-like hollow cross sectional shape which projects toward the vehicle interior side, a connecting portion 32 which is continuous with the hollow-shaped portion 31 toward the vehicle exterior side therefrom, and a design portion 33 which is positioned on the vehicle exterior side of the connecting portion 32. A U-shaped cross sectional area surrounded by three walls, i.e., an inner wall 35 which is portion of the hollow-shaped portion 31, the connecting portion 32 and the design portion 33, forms a glass guide portion 34. The glass guide portion 34 is a portion which guides up-and-down movements of the window glass 14, and a glass run (not shown) which holds an edge of the window glass 14 is inserted into the glass guide portion 34. The connecting portion 32 is provided with a reference surface 32a which extends in the vertical direction, and the insertion support portion 16a is provided, at the lower end thereof, with a projecting stepped portion (positioner/side-sash-side insertion limit portion) 36 as a portion of the connecting portion 32 which has a cut-and-raised shape projecting toward the opposite side of the reference surface 32a from the glass guide portion 34. An insertion hole 37 which extends through in the vertical direction is formed between the projecting stepped portion 36 and the reference surface 32a.

The lower sash 20 is provided with three sides, i.e., walls 21, 22 and 23, which are formed to correspond to the inner wall 35 of the hollow-shaped portion 31, the connecting portion 32 and the design portion 33 of the front side sash 16, respectively. The walls 21 and 22 face each other while the wall 23 connects the walls 21 and 22 to form a U-shaped cross section, and the space surrounded by the walls 21, 22 and 23 serves as a glass guide portion 24 which guides the window glass 14 so that the window glass 14 can move up and down inside the door panel 11. Similar to the glass guide portion 34 of the front side sash 16, a glass run (not shown) is inserted into the glass guide portion 24.

An upper bracket (positioner/upper bracket) 40 is fixed to the upper end of the lower sash 20. The upper bracket 40 is provided with a fit-over portion having a U-shaped cross section including three sides, i.e., walls 41, 42 and 43 that overlay the walls 21, 22 and 23 of the lower sash 20. Retaining lugs 44 and 45 project upward from the two walls 41 and 43, respectively, that face each other. The retaining lugs 44 and 45 are positioned to face each other and are provided at the ends thereof with guide portions 44a and 45a, respectively, which increase in distance therebetween in the upward direction. The retaining lug 44 and the retaining lug 45 are provided at the base portions thereof with a narrow-width retaining portion 44b and a narrow-width retaining portion 45b, respectively, which are smaller in distance therebetween than the guide portion 44a and the guide portion 45a. The retaining lug 44 and the retaining lug 45 are resiliently deformable in directions to change the distance therebetween. The lower sash 20 is further provided between the retaining lug 44 and the retaining lug 45 with a positioning lug 46 which projects upward from the wall 42. The positioning lug 46 is provided with an abutting surface (bracket-side insertion limit portion/width-widened portion) 46*a* having a wide width which is positioned on the base side close to the wall 42, and an insertion portion 46*b* having a narrow width which projects upward from the center of the abutting portion 46*a*. The end of the insertion portion 46*b* is semicircular in shape.

The upper end of the lower sash 20 is inserted into the fit-over portion of the upper bracket 40, which is configured of the walls 41, 42 and 43. Two inwardly narrowed portions 47 having an inwardly narrowed shape are formed between the walls 41 and 42 and between the walls 42 and 43, respectively, and the lower sash 20 is press-fitted into the upper bracket 40 by passing through the points where the narrowed portions 47 are formed.

A lower bracket (fixer) 50 is fixed to the lower sash 20 in the vicinity of the lower end thereof. As shown in FIG. 5, the lower bracket 50 is provided with a support portion 51 which is fixed to the wall 22 of the lower sash 20, and a bent portion 52 which is bent at a substantially right angle to the support portion 51, and a bolt insertion hole (fixer/communication hole) 53 is formed through the bent portion 52. A bolt insertion hole (fixer/communication hole) 55 which is positioned in alignment with the bolt insertion hole 53 in a positioned state of the lower sash 20 that will be discussed below is formed through the inner panel 18, which constitutes a component of the door panel 11. The insertion hole 53 of the lower bracket 50 is formed into a circular hole which corresponds to the diameter of the shaft portion of a bolt (fixer/fastening member) 56 for fastening the lower bracket 50 to the inner panel 18, and the bolt insertion hole 55 is formed into an elongated hole which is elongated in the vertical direction.

Figure 6:
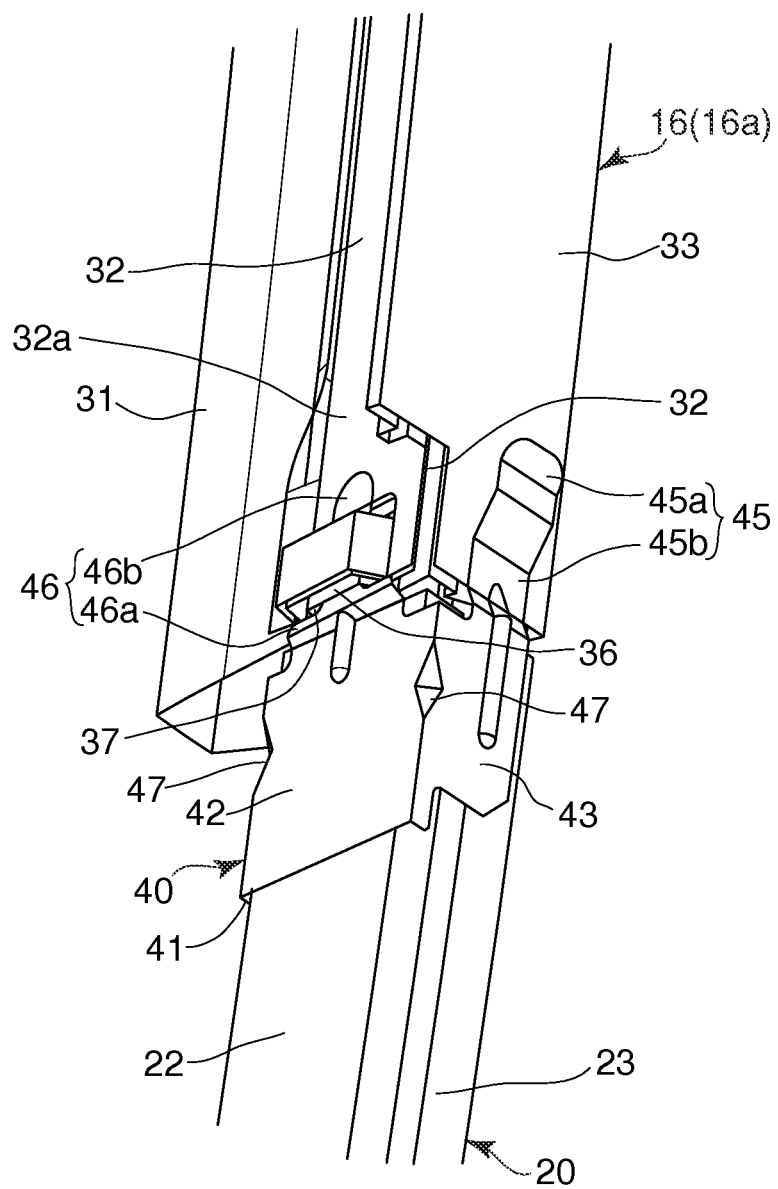
FIG. 6 is a perspective view of the joint between the front side sash, the upper bracket and the lower sash in a joined state.
Figure 7:
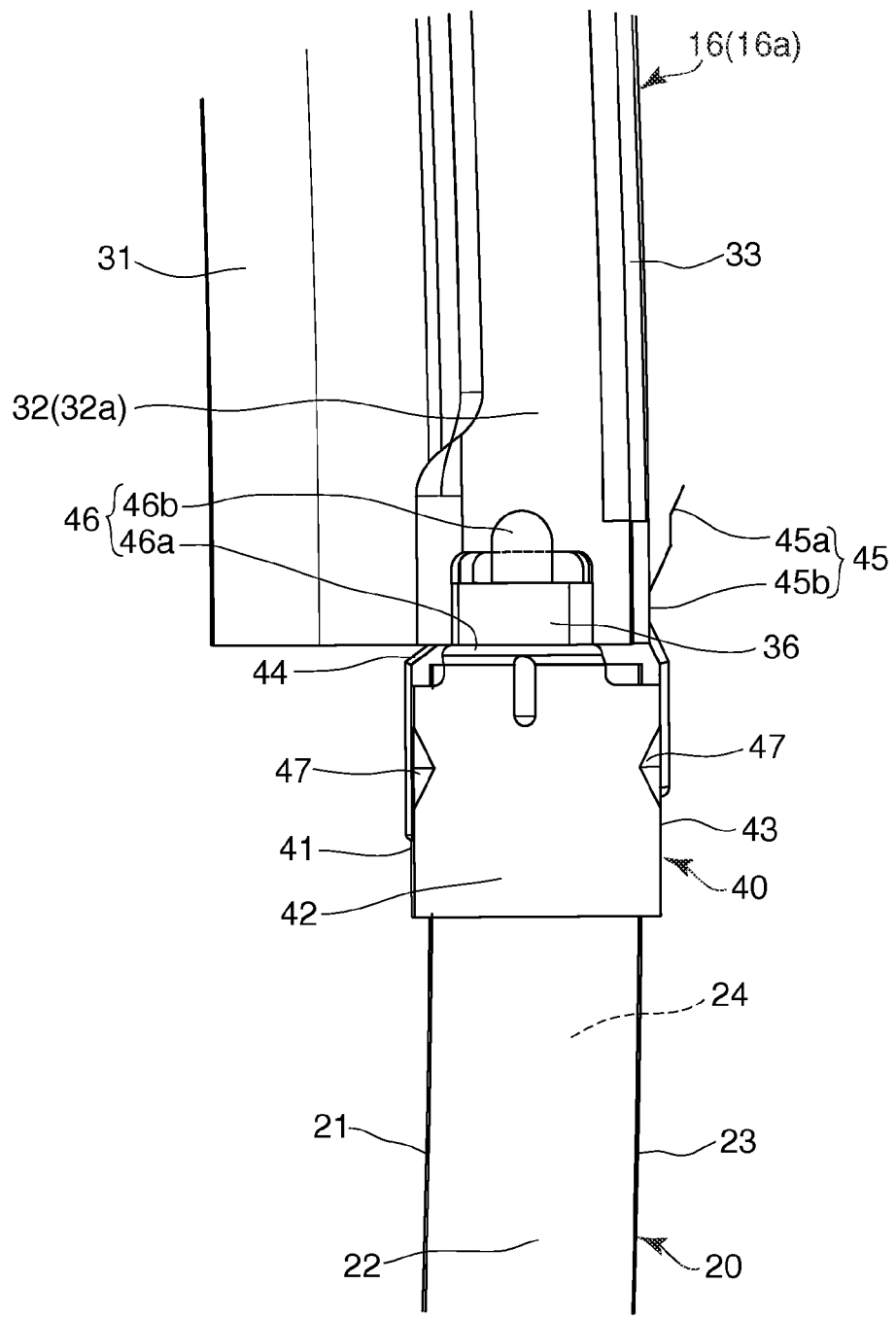
FIG. 7 is a front elevational view of the joint between the front side sash, the upper bracket and the lower sash in a joined state.
Figure 8:
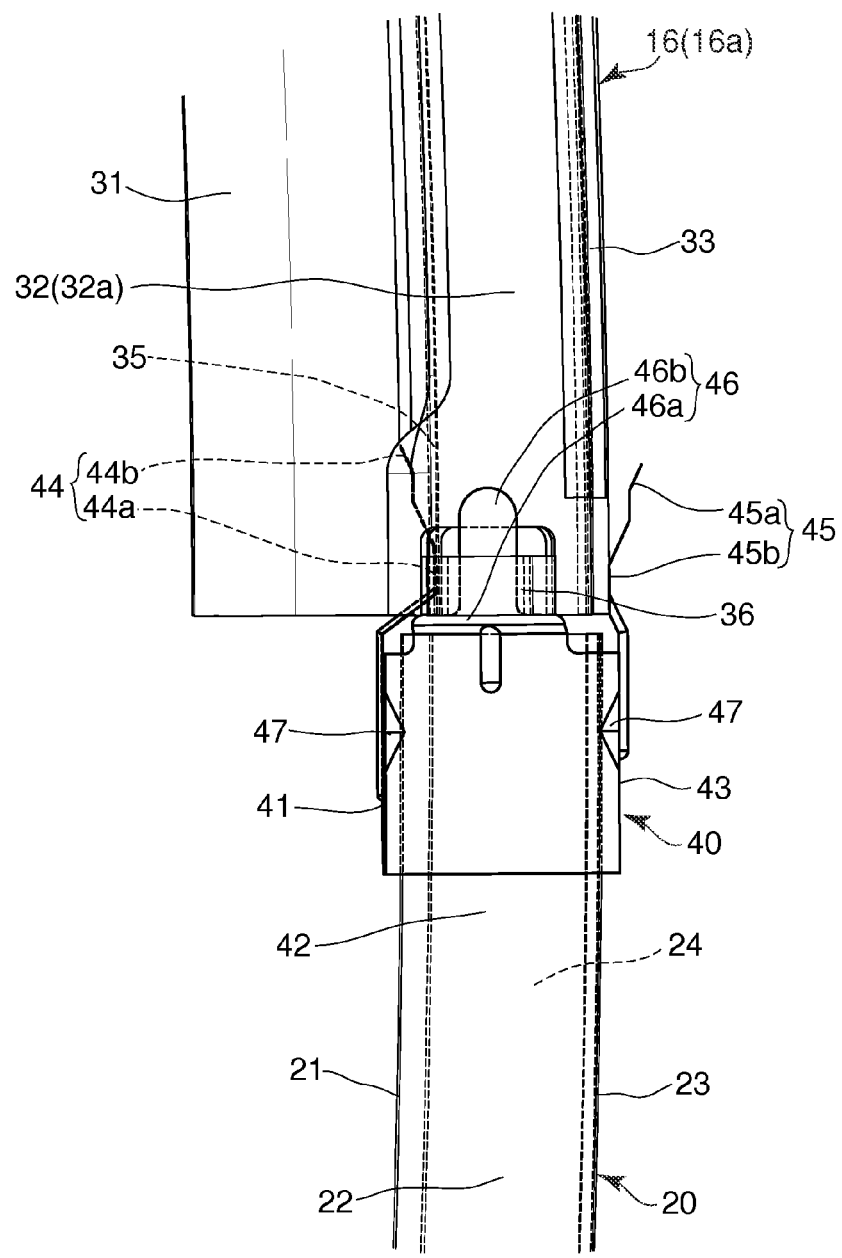
FIG. 8 is a front elevational view of the joint shown in FIG. 7 with a portion thereof shown transparently.

The lower sash 20 is mounted to the inner panel 18, which constitutes a component of the door panel 11, with the upper bracket 40 and the lower bracket 50 mounted to the lower sash 20. The door frame 12 except the lower sashes 20 and 60 is fixed to the inner panel 18 beforehand. When mounting the lower sash 20, an approximate position of the lower sash 20 is defined by making the upper bracket 40 abut against the insertion support portion 16*a* of the front side sash 16. More specifically, the upper bracket 40 is brought to approach the lower end of the insertion support portion 16*a* from below. Thereupon, the upper bracket 40 can be securely inserted up to the insertion position shown in FIGS. 6 through 8 without interfering with the lower end of the insertion support portion 16*a* while being guided by the guide portions 44*a* and 44*a*. As shown in FIGS. 6 through 8, in this state the insertion portion 46*b* of the positioning lug 46 of the upper bracket 40 has been inserted into the insertion hole 37 of the front side sash 16, and a portion of the insertion portion 46*b* in the vicinity of the end thereof is supported by the reference surface 32*a* of the connecting portion 32. Accordingly, the insertion portion 46*b* is sandwiched between the connecting portion 32 (the reference surface 32*a*) and the projecting stepped portion 36, so that the position of the upper bracket 40 (the lower sash 20) is defined relative to the front side sash 16 in the forward/rearward direction of the vehicle. Since the end of the insertion portion 46*b* of the positioning lug 46 is formed into a semicircular shape, there is no possibility of the positioning lug 46 being caught by the edge of the projecting stepped portion 36 when the positioning lug 46 is inserted into the insertion hole 37. In addition, the insertion position (vertical position) of the upper bracket 40 (the lower sash 20) relative to the front side sash 16 is defined by engagement of the abutting portion 46*a* of the positioning lug 46 with the lower end surface of the projecting stepped portion 36, which has a stepped shape projecting from the connecting portion 32. Additionally, the position of the upper bracket 40 (the lower sash 20) relative to the front side sash 16 in the vehicle interior/exterior side direction is defined by engagement of the narrow-width retaining portion 44*b* and the narrow-width retaining portion 45*b* with the inner wall 35 of the hollow shaped portion 31 and the design portion 33, respectively, following resilient deformation of the retaining lugs 44 and the retaining lug 45 of the upper bracket 40 in directions to increase the distance therebetween. The retaining lug 44 and the retaining lug 45 clamp the front side sash 16 at a predetermined pressure force, which can maintain the supporting state shown in FIGS. 6 through 8 even if one lets go his or her grip of the lower sash 20. In other words, a simplified positioning and fixing of the lower sash 20 with respect to the front side sash 16 can be performed using the upper bracket 40.

Subsequently, the lower bracket 50 is fixed to the inner panel 18. In a state where an approximate position of the lower sash 20 with respect to the front side sash 16 is defined via the upper bracket 40, the bolt insertion hole 55 (see FIG. 5), which is formed in the inner panel 18, and the bolt insertion hole 53 of the lower bracket 50 are aligned with each other. Thereafter, a bolt 56 is inserted into the bolt insertion hole 55 and the bolt insertion hole 53 thus aligned, and the lower bracket 50 is fixed to the inner panel 18 by fastening a nut on the bolt 56. Since the bolt insertion hole 55 of the inner panel 18 is formed as a vertically-elongated hole, the fixing position of the lower sash 20 that is fixed by the bolt 56 has a predetermined degree of freedom in the vertical direction. Accordingly, the lower sash 20 can be fixed even if the support position of the lower sash 20 that is temporarily determined using the upper bracket 40 has a slight individual difference.

As described above, since the lower sash 20 is mounted to the door panel 11 (the inner panel 18) by positioning the upper bracket 40 by making the upper bracket 40 abut against the lower end of the insertion support portion 16*a* of the front side sash 16 and subsequently fastening the lower bracket 50, which is provided with a degree of freedom in the fixing position thereof in the vertical direction with respect to the inner bracket 18, mounting workability is dramatically improved compared with a structure in which the upper end and the lower end of the lower sash 20 are each fixed to the inner panel 18 after being positioned and aligned with respect to the inner panel 18. In addition, it is not necessary anymore to provide a clearance between the insertion support portion 16*a* of the front side sash 16 and the lower sash 20 (the upper bracket 40), which also contributes to an improvement in mounting workability. Although the detailed description of the mounting structure of the lower sash 60 to the door panel 11 is omitted due to being substantially identical to that of the lower sash 20 to the door panel 11, an improvement in mounting workability has been achieved with the lower sash 60 also, which is shown in FIG. 2, by positioning an upper bracket (positioner/upper bracket) 140 on the upper end side by making the upper bracket 140 abut against the lower end of the rear side sash 17 and subsequently fastening a lower bracket (fixer) 150 on the lower end side to the inner bracket 18.

Although the present invention has been described based on the above illustrated embodiment, the present invention is not limited thereto. For instance, out of the bolt insertion holes 53 and 55, into which the bolt 56 that serves as a fixer is inserted, the bolt insertion hole 55 on the inner panel 18 is formed as an elongated hole in the above illustrated embodiment; however, it is also possible to form the bolt insertion hole 53 on the lower bracket 50 as a similar elongated hole and to form the bolt insertion hole 55 on the inner panel 18 as a circular hole which corresponds to the diameter of the shaft portion of the bolt 56.

Additionally, although the above illustrated embodiment is an example of an application to a front door of a vehicle, the present invention can be widely applied to doors so long as they have a structure like that of the present embodiment in which a lower sash is mounted inside a door panel.

INDUSTRIAL APPLICABILITY

As described above in detail, in the sash mounting structure and the sash mounting method according to the present invention, the positioning of the lower sash is performed by making the lower sash abut against the lower end of the side sash, while the fixer for fixing lower sash to the door panel has a predetermined degree of freedom in fixing position in the vertical direction. This facilitates the positioning of the lower sash when mounting the lower sash and makes it possible to accommodate variations in part accuracy and assembling accuracy, thus making it possible to achieve an improvement in productivity of doors having a lower sash(es).

REFERENCE SIGN LIST

10 Door
11 Door panel
12 Door frame
13 Window opening
14 Window glass
15 Upper sash
16 Front side sash
16a Insertion support portion
16b Frame exterior portion (projecting portion from the door panel)
17 Rear side sash
17a Insertion support portion
17b Frame exterior portion (projecting portion from the door panel)
18 Inner panel
20 60 Lower sash
21 22 23 Wall of the lower sash
24 Glass guide portion
31 Hollow shaped portion
32 Connecting portion
32a Reference plane
33 Design portion
34 Glass guide portion
35 Inner wall
36 Projecting stepped portion (positioner/side-sash-side insertion limit portion)
37 Insertion hole
40 140 Upper bracket (positioner/upper bracket)
41 42 43 Wall of the upper bracket
44 45 Retaining lug
44a 45a Guide portion
44b 45b Narrow-width retaining portion
46 Positioning lug
46a Abutting surface (bracket-side insertion limit portion/width-widened portion of the positioning lug)
46b Insertion portion
47 Narrowed portion
50 150 Lower bracket (fixer)
51 Support portion
52 Bent portion
53 Bolt insertion hole (fixer/communication hole)
55 Bolt insertion hole (fixer/communication hole)
56 Bolt (fixer/fastening member)

The invention claimed is:

1. A sash mounting structure for a vehicle door including a side sash which guides a window glass so that said window glass can move up and down, and which includes a projecting portion that projects upward from a door panel and an insertion support portion which is inserted into said door panel; and a lower sash which is continuous with a lower part of said side sash, wherein said lower sash is fixed to an inner side of said door panel and guides said window glass in said door panel, said sash mounting structure comprising:

positioners which are provided at an upper end of said lower sash and a lower end of said insertion support portion of said side sash, respectively, said positioners defining a position of said lower sash relative to said side sash by being mutually engaged; and a fixer which is provided in-between said lower sash and said door panel, has a predetermined degree of freedom in a fixing position in a vertical direction and fixes said lower sash to said door panel, wherein said positioner comprises an upper bracket which is provided as a separate member from said lower sash and is mounted to said upper end of said lower sash, wherein upward movement of said lower sash relative to said side sash is limited by engagement of a bracket-side insertion limit portion, which is formed on said upper bracket, with a side-sash-side insertion limit portion which is formed on a lower end of said side sash, wherein said side-sash-side insertion limit portion includes a projecting stepped portion which is formed by being cut and raised with respect to a reference surface of said side sash which is formed to extend in said vertical direction, wherein said upper bracket includes a positioning lug which projects upward from a fit-over portion which fits over said upper end of said lower sash, and which is inserted in-between said projecting stepped portion and said reference surface, and wherein said bracket-side insertion limit portion includes a width-widened portion which is formed on a base portion of said positioning lug to be capable of contacting a lower end surface of said projecting stepped portion.

2. The sash mounting structure for the vehicle door according to claim 1, wherein said fixer comprises:

a lower bracket which is fixed to a lower end of said lower sash; and a fastening member which is inserted into communication holes respectively formed in said lower bracket and said door panel, wherein one of said communication hole of said lower bracket and said communication hole of said door panel is formed as a hole which is elongated in said vertical direction.

3. The sash mounting structure for the vehicle door according to claim 1, wherein said upper bracket comprises a pair of retaining lugs which project upward from said fit-over portion, which fits over said upper end of said lower sash, in a mutually facing positional relationship to clamp said side sash in a state where said positioning lug is inserted in-between said projecting stepped portion and said reference surface, and wherein said positioning lug is provided in-between said pair of retaining lugs.

* * * * *